United States Patent [19]

Decrane

[11] Patent Number: 5,033,935
[45] Date of Patent: Jul. 23, 1991

[54] LATCH MECHANISM FOR PALLET DISPENSING MACHINE

[76] Inventor: Charles E. Decrane, 802 Janna St., West Monroe, La. 71291

[21] Appl. No.: 554,370

[22] Filed: Jul. 19, 1990

Related U.S. Application Data

[62] Division of Ser. No. 398,145, Aug. 24, 1989, Pat. No. 4,964,782.

[51] Int. Cl.⁵ ............................................. B65G 59/06
[52] U.S. Cl. ..................................... 414/798.1; 74/53
[58] Field of Search .................................. 74/53, 99 A;
414/797.14, 797.5, 797.6, 798, 798.1, 662, 672

[56] References Cited

U.S. PATENT DOCUMENTS

Re. 28,551 10/1975 Breitbach .
1,588,950  6/1920 Drake .
3,113,683 12/1963 Von Gal .
4,676,284  6/1987 DeCrane .

FOREIGN PATENT DOCUMENTS 1236996  3/1967 Fed. Rep. of Germany .
0158739  9/1984 Japan .
0238616 10/1986 Japan .

Primary Examiner—David A. Bucci
Assistant Examiner—Craig Slavin
Attorney, Agent, or Firm—Norvell E. Von Behren

[57] ABSTRACT

A latch mechanism for a pallet dispensing machine. A plurality of pallets are positioned in an upright movable frame positioned in a stationary frame in the pallet dispensing machine. The latch mechanism holds the stack of pallets as the movable frame is lowered and sets of the stack on a feeder conveyor. Further downward motion of the movable frame causes the latch mechanism to retract out of engagement by gravity. Thereafter the movable frame moves upwardly and the latch mechanism reengages the remaining pallets above the bottom pallet to lift the stack about an inch so that the feeder conveyor can feed the bottom pallet out of the machine.

24 Claims, 5 Drawing Sheets

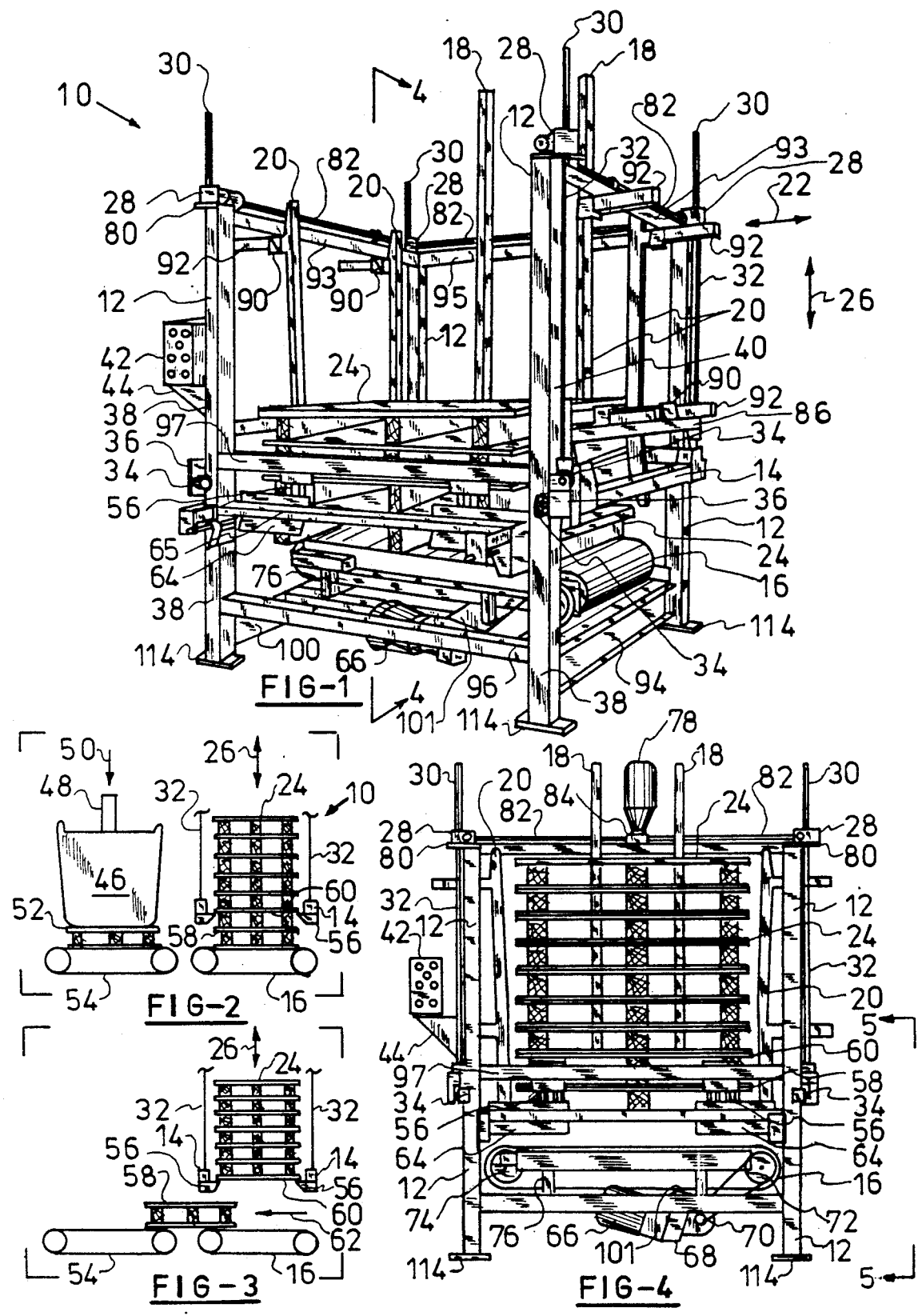

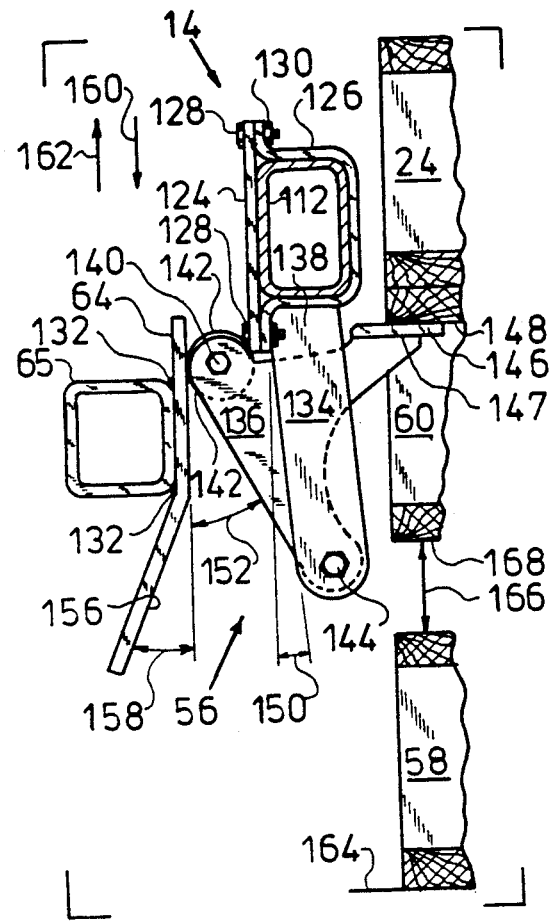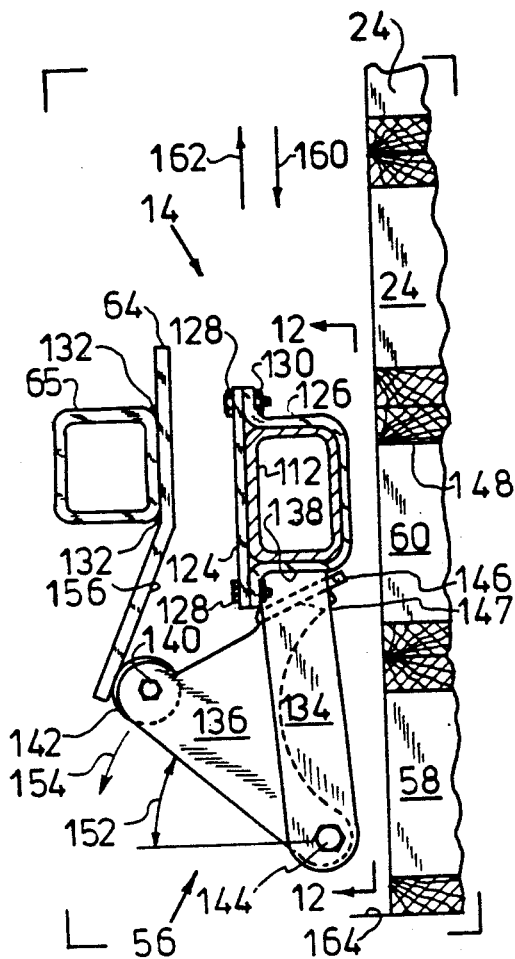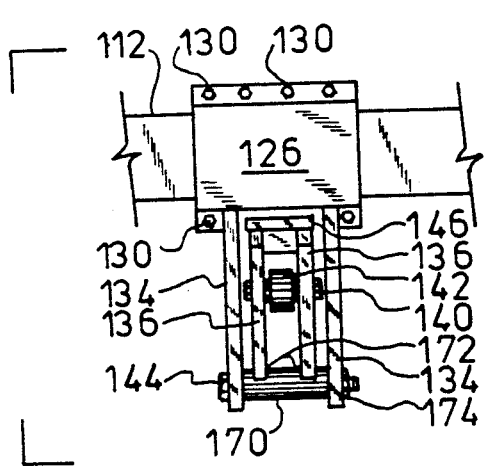

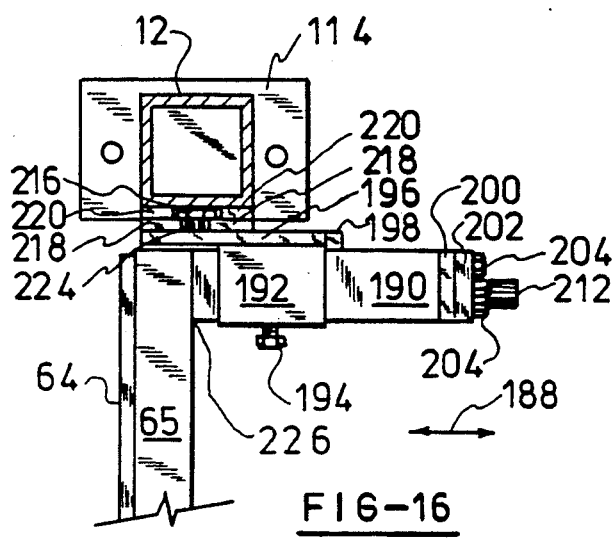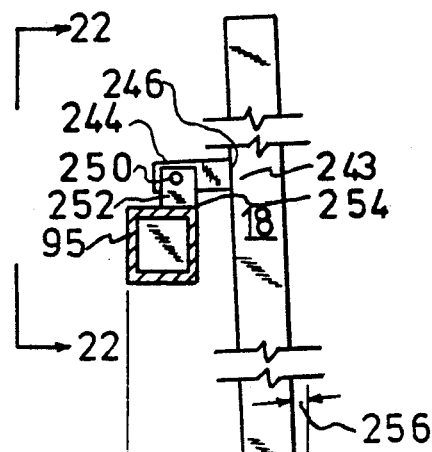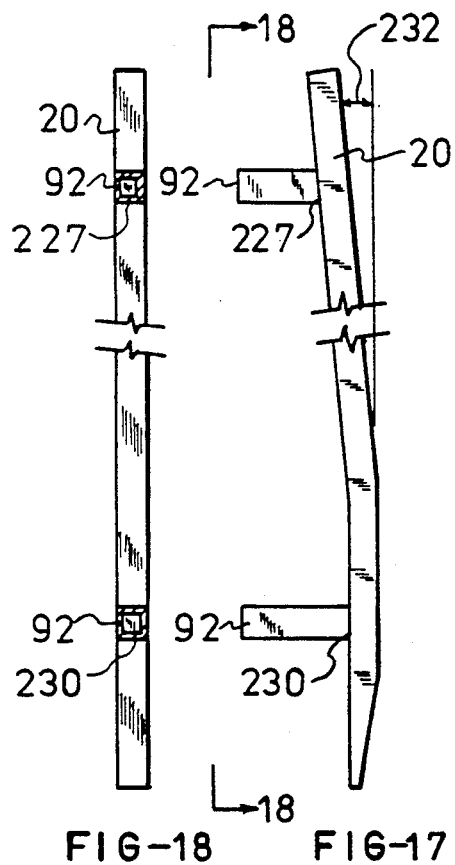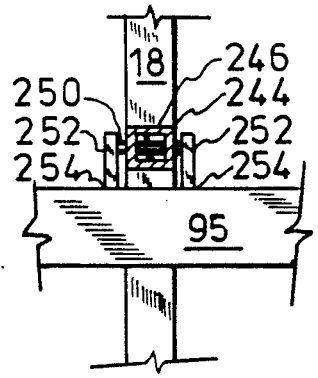

LATCH MECHANISM FOR PALLET DISPENSING MACHINE

CROSS REFERENCE TO RELATED APPLICATIONS

This application is a division of Ser. No. 07/398,145 filed Aug. 24, 1989 by Charles E. DeCrane and entitled: PALLET DISPENSING MACHINE WITH LATCH MECHANISM, now U.S. Pat. No. 4,964,782.

BACKGROUND OF THE INVENTION

This invention relates generally to pallet dispensing machines and in particular to a new and novel pallet dispensing machine that can handle the different types of pallets available on the market as well as deformed, or out of shape, used pallets that would cause trouble in prior art types of machines.

In the feeding of wooden or plastic pallets to a downstream operation, it is known in the prior art to use hydraulic rams to shove the bottom pallet from a stack of 10 to 12 pallets positioned above in a stationary frame. Such pallet dispensers use brute force to move the bottom pallet against the entire load of the pallets stacked on top. This type of dispensing can cause damage to the pallets, especially when some or all of the pallets are used or deformed with warped boards.

Another type of prior art pallet dispenser uses air operated pallet fingers to hold the stack of pallets up while a hydraulic ram pushes the lower pallet to the downstream conveyor. Deformed pallets also can cause extensive trouble in these prior art dispensers. Both of the above described prior art machines also require extensive floor space on one side of the dispenser for the hydraulic ram mechanism to operate to extend out and back in pushing the bottom pallet out of the stack.

The most common type of prior art pallet dispensers use a twin fork mechanism that is positioned on one side of the pallet dispenser to insert into the penultimate pallet to lift the entire stack up while the bottom pallet is moved out to a downstream position. Large air or hydraulic cylinders are used to accomplish the lifting with various chains and gears being used to create the motions to accomplish the multidirectional move. Such a complicated system also requires large floor space to accommodate the motion of the twin forks as well as extensive safety guards around the complicated machinery. Since the normal number of pallets can range from 10 to 12 in the stack, and pallets can range in weight from 35 to 170 pounds, it can be seen how this type prior art pallet dispenser can have problems due to the large load on the twin forks which must be lifted by cantilevered twin forks. Sag in the forks is a common problem when lifting the heavier pallets and maintenance can be high on this type of dispenser due to the complicated motion needed to accomplish the lifting.

While all of the before described prior art dispensers have been used before with varying results, each type has its own particular problems that make the pallet dispenser far from perfect.

SUMMARY OF THE INVENTION

In order to overcome the deficiencies of the prior art pallet dispensers, there has been provided by the subject invention a new and novel type of pallet dispenser that can be used on wooden as well as plastic pallets of various sizes. It can also be used with deformed pallets, caused by warped cover boards on the pallet.

A stationary frame is used with a movable inner frame with the pallets being held in a stacked position by the inner frame on novel latching means comprising a plurality of gravity operated fingers. As the movable inner frame is lowered by an electric motor operating several worm gear units, the previously positioned stack of pallets is deposited on a pallet feeder conveyor.

The movable inner frame then moves somewhat lower to permit the novel gravity operated fingers to disengage or move out of position under the bottom pallet. A control system then reverses the inner frame to move it upwardly so that a plurality of ramp plates can cause the latching fingers to again engage the pallet stack at the penultimate pallet. The entire stack of pallets is then raised about one inch above the last pallet and the last pallet is moved out of position by the pallet feeder conveyor.

As a result, the applicant's device can accept heavier pallets as well as deformed pallets by using the simple but novel latching means in combination with the ramp plate and the lifting and dispensing of the pallets is accomplished without using brute force or without long cantileverd forks or rams as in prior art dispensers.

Accordingly it is an object and advantage to provide a simpler but more practical pallet dispenser that will not cause damage to the pallets or will not require complicated machine motions to accomplish the dispensing.

Another object and advantage of the subject invention is to provide a new and novel gravity operated latching mechanism that can be used to eliminate the complicated machinery of prior art dispensers.

Yet another object and advantage of the subject invention is to provide a new type pallet dispenser that does not require large floor space for the complicated operating parts as is common in prior art dispensers.

These and other objects and advantages of the subject invention will become apparent after studying the drawings showing the applicant's invention and after reading the Description of the Preferred Embodiment which has been given by way of illustration.

BRIEF DESCRIPTION OF THE DRAWINGS

FIG. 1 is a perspective view of the applicant's new and novel pallet dispensing machine.

FIG. 2 is a diagrammatic representation of the applicant's dispensing machine showing it positioned beside a bag filling machine and moving in a downwardly direction.

FIG. 3 is a diagrammatic representation of the machine of FIG. 2 showing the machine moving in an upwardly direction.

FIG. 4 is a front elevational view, taken along lines 4—4 of FIG. 1.

FIG. 10 is a cross-sectional elevational view, taken along lines 10—10 of FIG. 9, showing the novel latch means in a disengaged or retracted position.

FIG. 11 is a view similar to the view of FIG. 10 showing the novel latch means in an engaged or activated position holding a stack of pallets.

FIG. 12 is an elevational view, taken along lines 12—12 of FIG. 10.

FIG. 16 is a cross-sectional plan view, taken along lines 16—16 of FIG. 15 showing in more detail the mounting of the adjustable ramp plates using the T-slot bolts.

FIG. 17 is a side elevational view of one of the four side guides telescopically mounted on the stationary outer frame.

FIG. 18 is a side elevational view of the side guide, taken along lines 18—18 of FIG. 17.

FIG. 19 is a partial cross-sectional elevational view taken along lines 19—19 of FIG. 13.

FIG. 20 is a side elevational view, taken along lines 20—20 of FIG. 19.

FIG. 21 is a cross-sectional view, taken along lines 21—21 of FIG. 19.

FIG. 22 is a side elevational view, taken along lines 22—22 of FIG. 19.

DESCRIPTION OF THE PREFERRED EMBODIMENT

Figure 5:
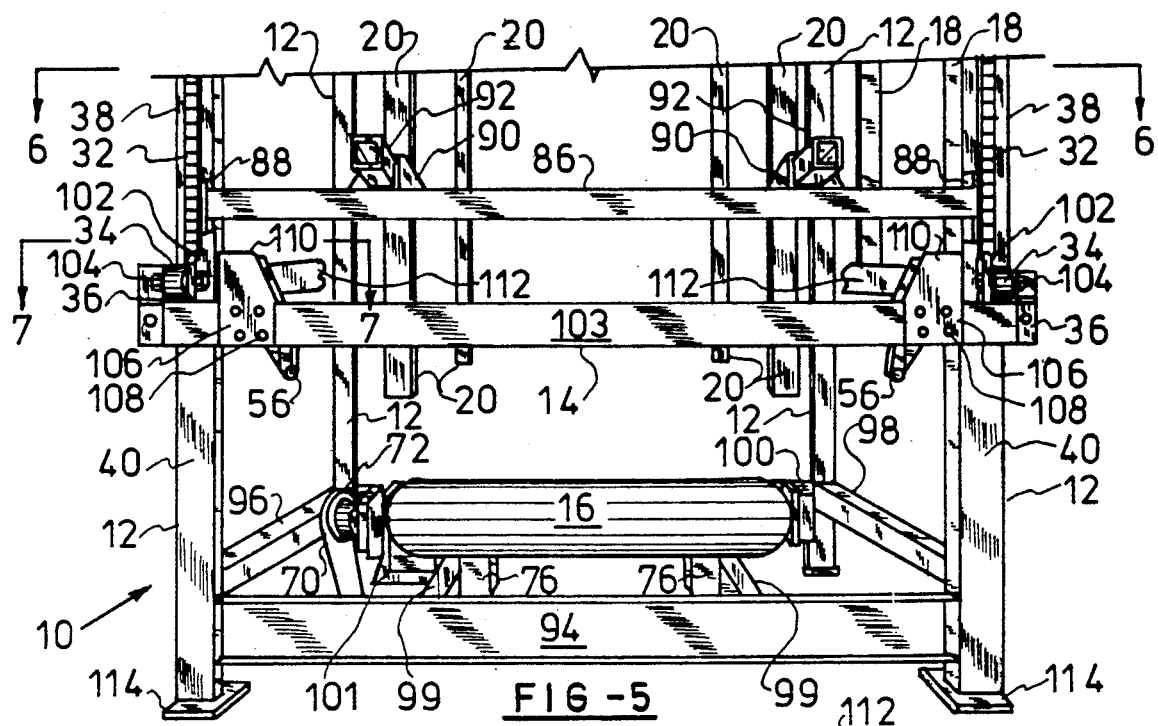
FIG. 5 is an enlarged side partial perspective view, taken along lines 5—5 of FIG. 4.

Referring now to the drawings in general and in particular to FIG. 1 of the drawings there is shown the applicant's new and novel pallet dispensing machine generally by the numeral 10 which comprises a stationary outer frame 12 comprising four upright members with cross members to be described hereinafter.

A vertically movable inner frame 14 is positioned with cross members to receive a stack of pallets 24 positioned within the stationary outer frame 12. The movable inner frame 14 is designed to move upwardly and downwardly on the stationary outer frame 12 in the direction shown by the arrow 26. A pallet feeder conveyor 16 is fixedly attached to the stationary frame 12 as will be described hereinafter.

The stationary outer frame 12 contains a pair of vertical rear guide bars 18 which may be fixed or adjustably mounted on the movable inner frame 12 within the spirit and scope of the invention. A pair of adjustable side guides 20 are also mounted on each side of the stationary outer frame 12. The side guides 20 are adjustable in and out in the direction shown by the arrow 22. A stack of 10 to 12 pallets is positioned in the stationary outer frame 12 on top of the pallet feeder conveyor 16 by a forklift truck from the front of the dispensing machine 10.

The applicant's new and novel machine is designed to handle plastic or wooden pallets in various sizes without the usual problems occurring as with prior art type machines. The pallets 24 are raised and lowered by the movable inner frame 14 during the operation of the machine by a plurality of worm gear actuators 28 and worm gears 30. A plurality of chains 32 are fixedly attached to the worm gears 30 and to the movable inner frame 14 as will be described hereinafter.

The movable inner frame 14 has a pair of rollers 34 which are rotatably mounted on the roller frame 36 which is also fixedly attached to the movable inner frame 14. The chains 32, which position the movable inner frame 14 up or down, are also connected to the roller frame 36. The pair of rollers 34, for each upright frame 12, roll on the adjacent surfaces 38 and 40 of the stationary outer frame as can be seen in FIG. 1. A control box 42 may be mounted on the pallet dispenser 10 by a bracket 44 or may be remotely positioned in the close proximity of the dispenser machine as desired by the purchaser of the machine.

Referring now to FIGS. 2-3 of the drawings there are shown diagrammatic representations of how the applicant's novel machine operates to help understand the simplicity of its operation over the before described prior art machines. The applicant's machine 10 may be positioned beside a bulk bag filling machine of the type commonly used in the prior art and in which a bulk bag 46 would be filled by a fill spout 48 formed on the bulk bag. Products such as chemical pellets would then be filled into the bulk bag 46 in the direction shown by the arrow 50.

The bulk bag 46 would be placed on the pallet 52 which would be delivered by the applicant's novel pallet dispenser. A bulk bag conveyor 54 may be used to deliver the bulk bag 46 to a downstream location or the filled bag 46 may be picked up on the pallet 52 by a forklift truck for delivery to a remote location. For further information on a novel type bulk bag filling machine, reference should be made to U.S. Pat. No. 4,676,284, issued June 30, 1987 to the applicant of this pallet dispensing machine.

The vertically movable inner frame 14 contains a plurality of new and novel latch means 56 which will be described more fully hereinafter. The latch means 56 are fixedly attached to the inner frame 14 and have pivotably mounted thereon latch arms for movement into and out of engagement with the penultimate pallet 60 from the stack of pallets 24.

FIG. 2 shows a stack of pallets 24 being lowered in the direction of the arrow 26 onto the pallet feeder conveyor 16. This would be accomplished by a forklift truck. The latch means 56 then engages the penultimate pallet 60 after the direction of the movable inner frame 14 is reversed to move upwardly in the direction shown by arrow 26 and in FIG. 3. The entire stack of pallets 24 is lifted upwardly about one inch as the novel latch means 56 engages the penultimate pallet 60 as will be described hereinafter. The bottom pallet 58 of the stack of pallets 24 is then delivered in the direction of the arrow 62 to the bulk bag filling machine or to an appropriate machine as desired.

Thereafter the cycle is repeated by the stack of pallets 24 being lowered as shown in FIG. 2 to continue the cyclic operation. The movement upwardly and downwardly of the inner frame and the movement of the pallet feeder conveyor 16 is controlled by the control box 42 using circuitry known in the art and forming no part of this application.

Referring now briefly back to FIG. 1 and then to FIG. 4, the actuation of the latch means 56 out of engagement with the penultimate pallet 60 is controlled by gravity as the inner frame 14 and the stack of pallets 24 move downwardly as will be described hereinafter. The actuation of the latch means 56 into engagement with the penultimate pallet 60, as shown in FIG. 3, is controlled by a plurality of ramp plates 64 fixedly attached to a crossbar 65 on the front and rear of the applicant's machine as can be seen in FIG. 1 and as will be shown and described in other drawing figures.

Turning now to FIG. 4 there is shown a front elevational view, taken along line 4—4 of FIG. 1, where there can be seen the feeder conveyor motor 66 which is a one-half horsepower, 230/460 volt, 3 phase, 1800 RPM motor of the type common in the marketplace. A Winsmith worm gear box 68 is connected to the motor 66 and has a 30 to 1 gear ratio which drives the feeder conveyor at the forward rate of 35 feet per minute through the chain 70 and the drum drive 72 at the head end of the conveyor 16. The feeder conveyor 16 is fixedly attached to the stationary outer frame 12 by the feeder conveyor frame 76 and the idler drum 74 for the conveyor is also carried by the same frame.

There can be seen at the top of FIG. 4 the movable inner frame drive motor 78 which is a Reliance one-half horsepower, 230/460 volt, 3 phase electric motor which operates at 1800 RPM. The motor 78 is mounted on a Browing gear box 84 which has a 1 to 1 ratio. Drive shafts 82 connect to the worm gear actuators 28 which are mounted on flat plates 80 welded to the top of the four vertical stationary frame components forming part of the stationary frame 12.

Referring now to FIG. 5 there is shown an enlarged partial perspective view, taken along lines 5—5 of FIG. 4 showing in more detail the positioning of the various parts of the applicant's machine as before described, the pair of vertical side guides 20 positioned on each side of the pallet dispenser 10 are adjustable inwardly and outwardly from the machine. A horizontal crossbar 86 is welded to a pair of plates 88 on each end thereof and the pair of plates 88 are welded to the stationary outer frame. A pair of channel brackets 90 are also welded to the horizontal crossbar 86. The horizontal bars 92, which are welded to the vertical side guides 20, slide in the channel brackets 90. A locking bolt, not shown, is used to lock the horizontal bar 92 in the channel bracket 90 at the desired position.

Each side guide 20 contains an upper and a lower horizontal bar 92 with the upper horizontal bar 92 being carried by an inverted channel bracket 90. These inverted channel brackets 90, on the upper portion of the machine, are welded to horizontal crossbars 93 as can be seen in FIG. 1. In a similar manner, the vertical rear guides 18 may be carried by the stationary outer frame 12 and may also be adjustable or fixed as desired.

Referring to the bottom portion of the pallet dispenser in FIG. 5 and also to FIG. 1, there will be described how the feeder conveyor is hung from the stationary outer frame 12. A pair of cross channels 94 and 100 are welded to the vertical stationary outer frame 12 and a pair of crossbars 96 and 98 are also welded there on opposite sides to strengthen and brace the bottom of the outer frame 12. The mid portion of the stationary frame is also braced by crossbars 97 as can be seen in FIG. 1.

A pair of cross channels 99 are welded to the cross channels 94 and 100 and the feeder conveyor frame 76 is fixedly attached to the cross channels 99. A sloped plate 101 is welded to the conveyor frame 76 and the electric motor 66 as well as the gearbox 68 are bolted to the slopped plate 101.

There will now be described in more detail the structure of the vertically movable inner frame 14. A pair of vertical plates 102 are welded on each end of the crossbar 103 forming a part of the inner frame 14 as can be seen in FIG. 5. The rollers 34 are rotatably mounted on a bolt 104 which is held by the plate 102. In a similar manner the other adjacent rollers 34 are rotatably mounted on a similar bolt and are held by the roller frames 36 which are also welded to the crossbar 103 on each end thereof. This will be shown in more detail hereinafter as will be the novel construction of the latch means 56.

Figure 6:
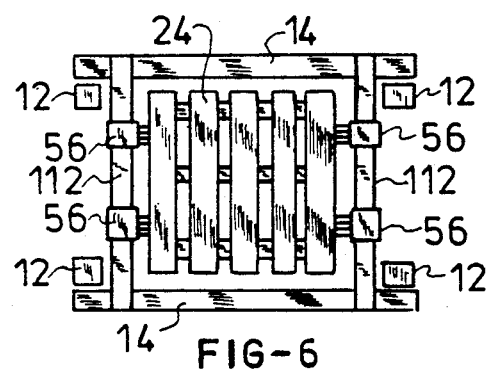
FIG. 6 is a diagrammatic plan view representation, taken along lines 6—6 of FIG. 5 and showing in simplified form how the movable inner frame 14 is formed and positioned in respect to the stationary outer frame 12.

The pair of latch means 56 on each side of the frame 14 are carried by a pair of crossbars 112 which are welded to the upper arms 110 of a pair of brackets 106 as can be seen in FIG. 5. The brackets 106 are fixedly held by bolts 108. In FIG. 5, for purposes of clarity, the crossbars 112 have been shown cut off but by referring to FIG. 6, the complete shape and positioning of the movable inner frame 14 can be seen in relation to the stationary outer frame 12. In addition, the position of the four latch means 56 can be seen relative to the crossbars 112 and the stack of pallets 24.

Figure 7:
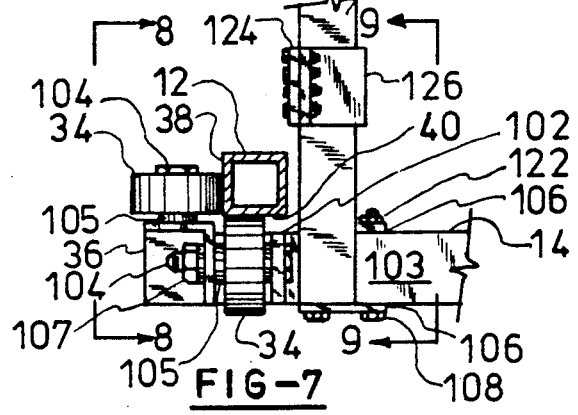
FIG. 7 is an enlarged partial cross-sectional plan view, taken along lines 7—7 of FIG. 5, showing in more detail how the movable inner frame 14 is positioned on the stationary outer frame 12.
Figure 8:
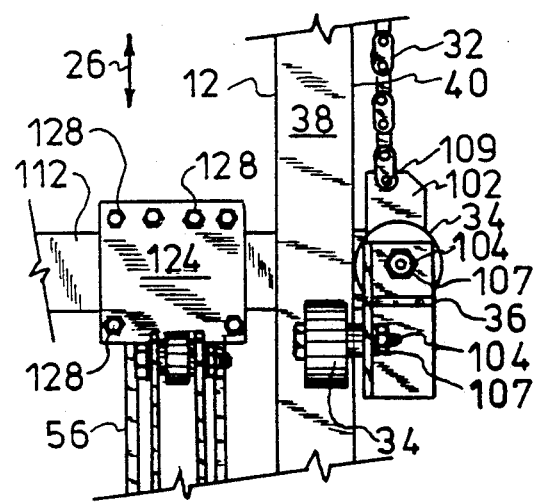
FIG. 8 is a partial elevational view, taken along lines 8—8 of FIG. 7.
Figure 9:
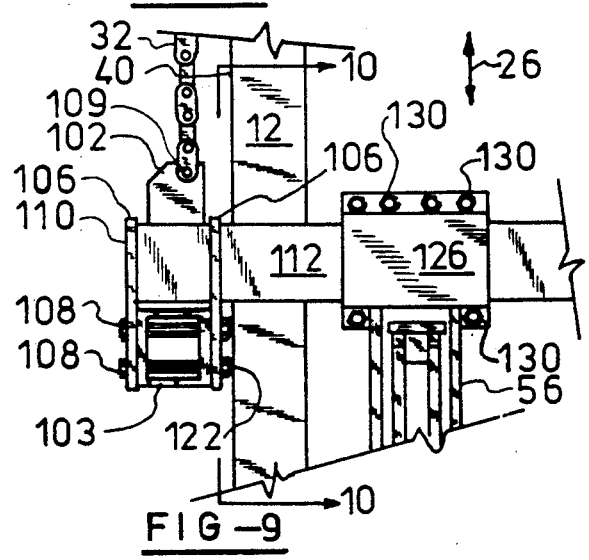
FIG. 9 is a partial elevational view, taken along lines 9—9 of FIG. 7.

Referring now to FIGS. 7-9 of the drawings there is shown in FIG. 7 an enlarged partial cross-sectional view, taken along lines 7—7 of FIG. 5, and showing the movable inner frame 14 having the crossbar 112 fixedly attached thereto. As before described, a pair of rollers 34 are carried by the roller frame 36 and the vertical plate 102 which is welded to the end of the movable frame 14. The roller shaft bolts 104 are positioned through the rollers 34 and spacers 105 and are held in place by the nuts 107. The vertical plate 102 also extends above the rollers 34 and terminates where the chain 32 is fixed to its upper end at 109 by means common in the art.

Each corner of the vertically movable inner frame 14 would be formed as shown in FIGS. 7-9. It can then be seen how the inner frame is free to ride up or down, in the direction shown by the arrow 26, with the rollers 34 riding on the vertical surfaces 38 and 40 of the fixed outer frame 12. A plurality of flat plates 114 are welded to the bottom of the outer frame 12.

There can also be seen in FIGS. 8 and 9 how the horizontal crossbar 112 is welded to a pair of brackets 106 which are fixedly attached to the movable inner frame 14 by a plurality of bolts 108 and nuts 122. When constructed thusly, the movable inner frame comprises the spaced apart frame members 14, and the spaced apart crossbar members 112 and the various rollers 34 and attaching structure such as the roller frame 36, and the plates 102 and the various bolts 104 and nuts 107 among others. This is the basic structure shown in FIG. 6.

There can also be seen in FIGS. 7-9 the novel latch means 56 which is attached to the crossbars 112 by means of the vertical flat plate 124 and the generally side positioned U-shaped plate 126. A plurality of bolts 128 and nuts 130 tightly clamp the plates 124 and 126 together to hold the latch means 56 on the crossbars 112.

Referring now to FIGS. 10-11 there will now be described the construction of the novel latch means 56 which comprises a pair of spaced apart downwardly and inwardly inclined fixed arms 134 which are welded at 138 to the underside of the U-shaped plate 126. A pair of upwardly and outwardly inclined movable arms 136 are positioned between the spaced apart fixed arms 134. A bolt 140 is positioned through the arms 136 and through a roller 142 which is rotatably mounted between the movable arms 136. A bolt 144 is positioned through the lower portion of the fixed arms 134 and through the lower portion of the movable arms 136 and a spacer, not shown in the drawing FIGS. 10–11, is used to position the arms in a spaced apart relationship parallel with each other. A nut, not shown in FIGS. 10–11, holds the bolt 140 as well as the bolt 144 in place.

A flat plate 146 is welded, at 147, to the top of the inner movable arms 136 and forms the lifting surface to raise and lower the stack of pallets 24 including the penultimate pallet 60, on the underside 148 of the pallet 60, as can be seen in FIG. 11. The inward angle of the fixed arms 134 is approximately 6° from the vertical as shown by the numeral 150 in FIG. 11 and the outward angle of the movable arms 136, as shown by the numeral 152 in FIG. 11 & FIG. 10, is approximately 28°.

As a result of the relative distribution of weight on each side of the pivot point of the movable arms 136, at the bolt 144 and the plate 146 as well as the roller 142 and bolt and nut 140, the center of gravity of the movable arms 136 is to the left of the pivot of the bolt 144, as you look at FIG. 10. This means that the movable arms 136 will pivot, by gravity, downward as shown by the arrow 154, as long as no load of pallets is positioned on top of the flat plate 146.

The movable arms 136 are activated from the non-engaged or retracted position shown in FIG. 10 to the engaged or activated position shown in FIG. 11 by means of an inclined ramp plate 64 which is welded at 132 to the horizontal crossbar 65 positioned and welded to opposite vertical portions of the stationary outer frame 12. The surface 156 of the ramp plate is approximately 23° from the vertical as shown by the arrow at 158.

It can then be seen in FIG. 10 that whenever the movable inner frame 14, which has the four latch means 56 attached to the spaced apart crossbars 112, moves downwardly in the direction shown by the arrow 160, the movable arms 136 will pivot, by gravity outward into the position shown in FIG. 10. Whenever the direction of the movable inner frame 14 is reversed to move upwardly, as shown by the arrow 162, the roller 142, on the movable arms 136 of each latch means 56, will engage the sloped surface 156 of the ramp plate 64, as shown in FIG. 11 to drive the movable arms into engagement with the underside 148 of the penultimate pallet 60. This is shown in FIG. 11 and the further movement upwardly, in the direction shown by the arrow 162, will lift the penultimate pallet 60 as well as the remaining pallets 24 positioned on the top thereof. This group of pallets would be raised approximately one inch as shown by the arrow 166.

As a result, the bottom pallet 58 of the stack, which had been previously positioned on the surface 164 of the pallet conveyor 16, is now able to clear the underside 168 of the penultimate pallet 60 whenever the conveyor 16 is activated by the control box 42.

In activating the machine cycle, the movable inner frame 14, containing the four latch means 56, would be lowered downwardly in the direction shown by arrow 160 until the movable arms 136 would disengage or move to the position of FIG. 10 by gravity. A stack of pallets 24 would then be loaded onto the surface 164 of the conveyor 16 by a forklift truck. For purposes of this description, the stack of pallets is numbered 24 while the bottom pallet is numbered 58. The penultimate pallet, or the next pallet above the bottom pallet, is numbered 60.

The reversal of the inner frame to move upwardly in the direction shown by the arrow 162 then causes the roller 142 to engage the ramp plate 64 to again engage the latch means 56 so that the flat plate 146 engages the underside of the penultimate pallet. This sequence is then repeated with the bottom pallet 58 moved out by the conveyor 16 as the pallet stack 24 is again lowered onto the top surface of the conveyor.

Referring now to FIG. 12 of the drawings there is shown an elevational view, taken along lines 12—12 of FIG. 10 showing more detail on the positioning of the pair of fixed arms 134 with the pair of movable arms 136 positioned inside thereof for each latch means. A spacer 170 is used to separate the arms on the bolt 144 and the nut 174 holds the ends of the arms together. The pair of inner movable arms 136 on each latch is then free to rotate inside of the pair of fixed outer arms 134 as before described after the inner arms 136 are welded at 172, to the spacer 170.

Figure 13:
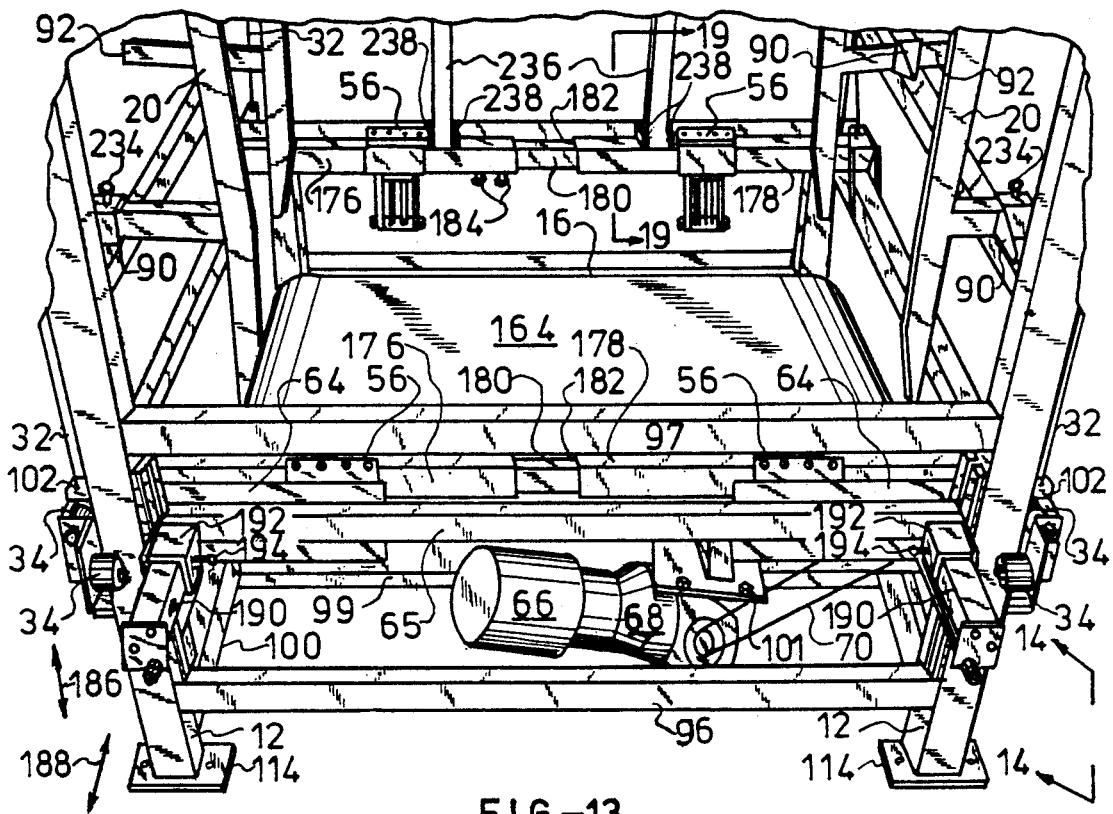
FIG. 13 is a partial lower perspective view of the applicant's pallet dispensing machine similar to the view of FIG. 1 but showing in more detail the lower portion of the machine.

Referring now to FIG. 13 there is shown a partial lower perspective view of the pallet dispensing machine similar to the view of FIG. 1, but showing in more detail the lower portion of the applicant's novel machine. It may be desirable to provide horizontal adjustment to the movable inner frame 14 and to provide means to be able to remove it from the outer frame 12. When desired, the horizontal crossbars 112 may be formed in two pieces, 176 and 178, somewhat shorter as shown with a smaller crossbar 180 positioned inside and welded on one end to the crossbar 178 at 182. The other end of the smaller crossbar 180 would be positioned inside the crossbar 176 and would be free to slide therein for adjustment or removal. A pair of locking bolts 184 are used to lock the inner crossbar 180 to the outer crossbar 176 as the desired position.

There is also shown in FIG. 13 further detail on the adjustment features on the ramp plates 64 which can be adjusted up or down, as shown by the arrow 186 and/or in and out, as shown by the arrow 188. The crossbar 65 has welded thereto at right angles, a pair of bars 190 which slide horizontally in a guide 192 with a pair of lock bolts 194 being used to tightly hold the tube in the guide at the desired position.

Figure 14:
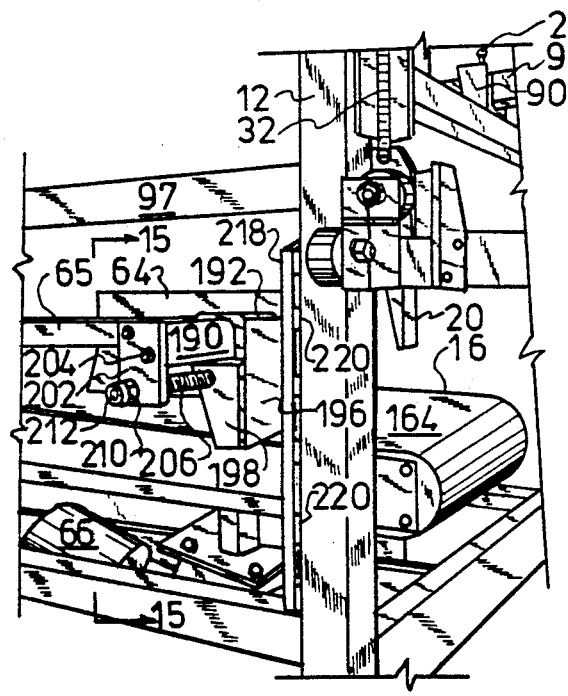
FIG. 14 is an enlarged right corner perspective view, taken along lines 14—14 of FIG. 13 showing in more detail the adjustment features of the ramp plates.
Figure 15:
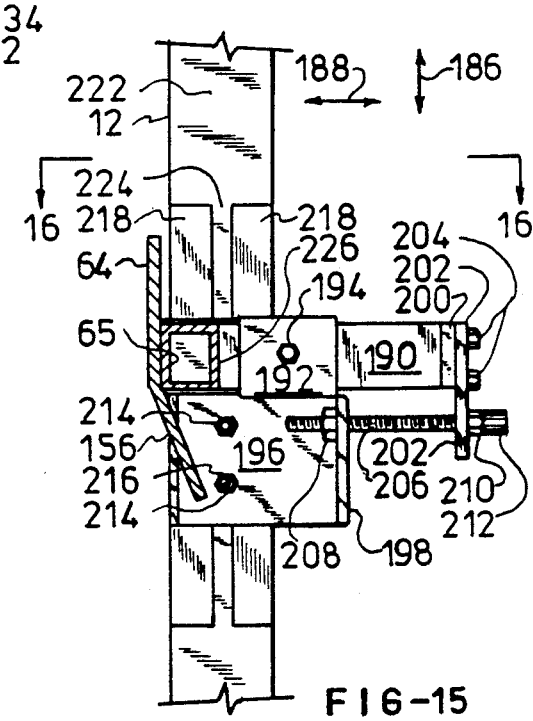
FIG. 15 is a partial cross-sectional elevational view, taken along lines 15—15 of FIG. 14 showing in more detail the adjustment features of the ramp plates.

Referring now also to FIGS. 14 and 15 as well as FIG. 13, there will be described in more detail the adjustments of the ramp plates 64. A plate 196 is welded to the tube guide 192 and a second plate 198 is also welded at a right angle to the plate 196. A plate 200 is welded to the end of the tube 190 and a plate 202 is fixedly attached thereto by a pair of bolts 204 which are positioned in drilled holes, not shown, in the plate 202 and tightly held in drilled and tapped holes, not shown, in the plate 200.

A three-quarter inch acme rod 206 with a square buttress thread is positioned on one end in a nut 208 which is welded to the plate 198 as can be seen in FIG. 15. The plate 198 as well as the plate 202 contain holes, not shown, to receive the acme rod 206. The end of the rod 206 contains a head 210 to which is welded a socket 212. To adjust the ramp plates 64 in and out of engagement with the latch means 56, in the direction shown by the arrow 188, requires a turn of the socket 212 which will drive the tube 190 in or out of the tube guide 192.

The vertical adjustment, in the direction of the arrow 186 is accomplished by loosing two T-slot nuts 214 which are used to tighten two T-slot bolts 216 positioned through holes, not shown in FIGS. 14 and 15. A pair of T-slot guides 218 are welded to the plurality of bars 220 which are in turn welded to the surface 222 of the stationary vertical outer frame 12 to form the T-slots 224 to receive the head of the T-slot bolt 216. In this manner, the entire structure supporting the pair of ramp plates 64, on each side of the machine, can be raised or lowered to the proper height as desired to adjust to different types of pallets 24.

Referring now to FIG. 16 of the drawings there is shown a cross-sectional plan view, taken along lines 16—16 of FIG. 15 showing in more detail the mounting of the adjustable ramp plates using the T-slot bolts 216. As before mentioned, the T-slot 224 is formed by welding the T-slot guides 218 to the T-slot bars 220 to form the T-slot. The head of the bolt 216 is positioned in the T-slot and is free to ride up or down in the slot during adjustment of the ramp plates upwardly or downwardly. The pair of tubes 190 are welded at 226 on each end of the crossbar 65 to form the sliding structure that moves inwardly or outwardly in the direction of the arrow 188. The lock bolts 194 then can lock the mechanism at the desired position.

Referring now to FIGS. 17-18 of the drawings there is shown in some detail the construction of the adjustable side guides 20. As before mentioned, a horizontal bar 92 is welded at 227 to the side guide 20 on the upper portion thereof. In a like manner, the longer horizontal bar 92 is welded at 230 to the lower portion of the side guides 20. The upper portion of the side guides 20 may be formed at an angle of approximately 5° as shown by the angle 232 to aid the folklift operator in stacking the pallets in the dispensing machine.

When constructed as shown in FIGS. 17-18 the pair of side guides 20 on the right and left side of the machine then can be positioned in the channel brackets 90 and can then be locked in place by the lock bolts 234 as can be more clearly seen in FIG. 13. The top horizontal bars 92, as well as the longer lower horizontal bars 92, each can be inserted in the channel brackets 90 and can be individually locked in place.

Referring now to FIGS. 19-22 there will be shown in more detail, the mounting of the two rear guides 18 on the pallet machine. FIG. 19 is a partial cross-sectional elevational view, taken along lines 19—19 of FIG. 13 and shows how the lower end of the rear guides is mounted on the crossbars 176 and 178 forming a part of the vertically movable inner frame 14. The upper end of the rear guides 18 is pivotably mounted on the horizontal crossbar 95 forming a part of the stationary outer frame 12.

The rear guides 18 have positioned in the lower end at 235 another vertical bar 236 which slides inside thereof as the movable inner frame raises or lowers. A pair of spaced apart plates 238 are welded at 239 to the crossbar 178 and a bolt 240 is positioned in holes, not shown, in the plates 238 as well as in the sliding vertical bar 236. A nut 242 is then positioned on the end of the bolt 240 with the bolt 240 then serving as a pivot point for the rear guides 18 as the inner bar 236 moves upwardly or downwardly.

On the upper end of the rear guides at 243 a short horizontal bar 244 is welded at 246 and may be positioned between two plates 252 which have been welded at 254 to the horizontal crossbar 95. A pin 250 or a bolt may then be used to serve as the pivot point on the upper end of the rear guides 18 to permit vertical movement of the guides. Since the inner frame 14 moves only about 9 inches during its complete cycle, the angle 256 from the vertical is shallow and approximately 2° is sufficient to cover the respective motions. Since the movable inner frame 14 is offset from the stationary outer frame 12, as shown by the arrow 258, the construction shown may be used so that the vertical bar 236 is able to slide inside of the vertical guide 18 without binding.

While the preferred embodiment in its various details has been shown and described, it should be apparent that structural changes may be made in the various mechanisms and parts and these changes are considered to be within the spirit and scope of the invention. The before described preferred embodiment has been given by way of illustration only and the applicant is not to be limited to the exact embodiment given.

Having described my invention, I claim:

1. A latching mechanism for use on a pallet dispensing machine having opposite sides and having fixed and movable horizontal frame members, the pallet dispensing machine being the type that dispenses pallets, from a stack of vertical pallets, one at a time onto a feeder conveyor positioned below the machine, comprising:
   (a) at least a pair of spaced apart downwardly and inwardly inclined first arms, the first arms inclined towards the stack of pallets;
   (b) attaching means, fixedly attached to the first arms, for attaching the latching means first arms to a vertically movable portion of the horizontal frame members;
   (c) at least a pair of upwardly and outwardly inclined second arms, rotatably mounted between the spaced apart downwardly and inwardly inclined first arms, the second arms inclined away from the stack of pallets;
   (d) a roller, rotatably mounted on each of the second arms; and
   (e) a flat plate latch fixedly attached to an upper portion of each second arm for engagement with the pallets.

2. The latching mechanism as defined in claim 1 wherein the first arms are sloped downwardly and inwardly at an angle of approximately 6° from vertical.

3. The latching mechanism as defined in claim 2 wherein the second arms are sloped upwardly and outwardly approximately 28° from horizontal when the second arms are in a retracted position.

4. The latching mechanism as defined in claim 1 wherein the pair of first arms are sloped approximately 6° from vertical and a pair of second arms are sloped approximately 28° from horizontal when the second arms are in a retracted position, the slope of the first and second arms, along with the weight of the second pair of arms, causing the second pair of arms to rotate outwardly and downwardly by gravity whenever the weight of a load of pallets is removed from the flat plate latch and whenever the latching means is attached below one of the vertically movable horizontal frame members by the attaching means.

5. The latching mechanism as defined in claim 1 wherein a pair of first and second arms are positioned on each of the opposite sides of the pallet dispensing machine.

6. The latching mechanism as defined in claim 1 wherein the pallet dispensing machine has ramp means formed thereon on a fixed portion of the horizontal frame members and the ramp means serve to engage the rollers on the second arms to position the latching means in a predetermined position.

7. In the latching mechanism of a pallet dispensing machine having a plurality of movable and fixed horizontal frame members, the machine serving to dispense the bottom pallet from the bottom of a vertical stack of pallets and having means for raising and lowering the stack of pallets as desired, the improvement comprising latch means for cooperation with the pallets of the pallet dispensing machine, the latch means being attached to the machine and the latch means having latch arms for movement into engagement and out of engagement with one of the pallets of the stack of pallets, the latch means being gravity activated to move out of engagement and being activated by ramp means to move into engagement with one of the pallets.

8. The improvement as defined in claim 7 wherein the latch means are carried by a movable portion of the horizontal frame members.

9. The improvement as defined in claim 8 wherein the ramp means are carried by a fixed portion of the horizontal frame members.

10. The improvement as defined in claim 9 wherein the ramp means are inclined along a portion thereof approximately 23° from the vertical.

11. The improvement as defined in claim 7 wherein the latch means comprises at least a pair of latch means on each side of the pallet dispensing machine and the ramp means comprises at least a pair of ramp means for each latch means.

12. The improvement as defined in claim 7 wherein the latch means move into engagement and out of engagement with the penultimate pallet of the stack of pallets.

13. In the latching mechanism of a pallet dispensing machine having a plurality of movable horizontal frame members and a plurality of fixed horizontal frame members, the machine serving to dispense the bottom pallet from the bottom of a vertical stack of pallets and having means, associated with the plurality of movable horizontal frame members, for raising and lowering the stack of pallets as desired, the improvement comprising at least two latches positioned on the plurality of movable horizontal frame members for movement into and out of engagement with one of the pallets of the stack of pallets, the latches being gravity activated to move out of engagement and being ramp activated to move into engagement with one of the pallets.

14. The improvement as defined in claim 13 wherein the pallet dispensing means has a pair of latches on each side of the machine.

15. The improvement as defined in claim 13 wherein the latches are formed with downwardly and inwardly inclined first arms which are inclined towards the stack of pallets and the latches are formed with upwardly and outwardly inclined second arms which are inclined away from the stack of pallets.

16. The improvement as defined in claim 15 wherein the first arms are sloped at an angle of approximately 6° from the vertical and the second arms are sloped at an angle of approximately 28° from the horizontal when the second arms are in a retracted position.

17. A latch mechanism for attachment to a movable horizontal frame member of a pallet dispensing machine, for dispensing the bottom pallet from a stack of pallets, comprising:
(a) attaching means for attaching the latch mechanism to the horizontal frame;
(b) a gravity and ramp operated arm fixedly attached to the attaching means, the arm comprising,
(1) a first arm inclined towards the stack of pallets and fixedly attached to the attaching means;
(2) a second arm inclined away from the stack of pallets and rotatably mounted on the first arm;
[a] means mounted on the second arm for engagement with a ramp; and
[b] means, fixedly mounted on the second arm, for engagement with one of the pallets of the stack of pallets.

18. The latch mechanism as defined in claim 17 wherein the first and second arms are carried below the attaching means and the attaching means comprises a generally U-shaped member bolted to a flat plate.

19. The latch mechanism as defined in claim 17 wherein the means mounted on the second arm for engagement with a ramp comprises a rotatably mounted roller and the means fixedly mounted on the second arm for engagement with one of the pallets comprises a horizontally positioned flat plate latch.

20. The latch mechanism as defined in claim 17 wherein the first arm is inclined at an angle of approximately 6° from vertical and the second arm is inclined at an angle of approximately 28° from horizontal when the second arm is in a retracted position.

21. The latching mechanism as defined in claim 2 wherein the second arms are sloped upwardly and outwardly approximately 28° from horizontal when the second arms are in a retracted position and are sloped upwardly and outwardly approximately 28° from vertical when the second arms are in an engaged position.

22. The latching mechanism as defined in claim 1 wherein the pair of first arms are sloped approximately 6° from vertical and a pair of second arms are sloped approximately 28° from horizontal when the second arms are in a retracted position and are sloped approximately 28° from vertical when the second arms are in an engaged position.

23. The improvement as defined in claim 15 wherein the first arms are sloped at an angle of approximately 6° from the vertical and the second arms are sloped at an angle of approximately 28° from the horizontal when the second arms are in a retracted position and are sloped at an angle of approximately 28° from vertical when the second arms are in an engaged position.

24. The latch mechanism as defined in claim 17 wherein the first arm is inclined at an angle of approximately 6° from vertical and the second arm is inclined at an angle of approximately 28° from horizontal when the second arm is in a retracted position and is inclined at an angle of approximately 28° from vertical when the second arm is in an engaged position.

* * * * *